United States Patent
DiPaolo

(10) Patent No.: US 9,872,587 B1
(45) Date of Patent: Jan. 23, 2018

(54) DUAL-CHAMBER CARAFE

(71) Applicant: Diane L. DiPaolo, Johnston, RI (US)

(72) Inventor: Diane L. DiPaolo, Johnston, RI (US)

( * ) Notice: Subject to any disclaimer, the term of this patent is extended or adjusted under 35 U.S.C. 154(b) by 0 days.

(21) Appl. No.: 15/168,344

(22) Filed: May 31, 2016

(51) Int. Cl.
| | |
|---|---|
| B65D 47/26 | (2006.01) |
| A47J 41/00 | (2006.01) |
| B65D 25/04 | (2006.01) |
| B65D 51/16 | (2006.01) |
| B65D 81/38 | (2006.01) |
| B65D 25/42 | (2006.01) |
| B65D 25/30 | (2006.01) |
| B65D 39/00 | (2006.01) |

(52) U.S. Cl.
CPC .......... *A47J 41/0055* (2013.01); *B65D 25/04* (2013.01); *B65D 25/30* (2013.01); *B65D 25/42* (2013.01); *B65D 39/0005* (2013.01); *B65D 51/1644* (2013.01); *B65D 81/3865* (2013.01)

(58) Field of Classification Search
CPC ...... B65D 47/265; B65D 25/04; B65D 25/30; B65D 25/42; B65D 81/3865; A47J 41/0055; A47G 2019/122
USPC ..... 222/572, 544–563, 521, 129–145.8, 466; 215/6; 220/543
See application file for complete search history.

(56) References Cited

U.S. PATENT DOCUMENTS

| | | | | |
|---|---|---|---|---|
| 2,815,154 | A * | 12/1957 | Smith | B65D 47/265 222/452 |
| 4,651,900 | A | 3/1987 | Horvath | |
| 4,703,871 | A | 11/1987 | Broker | |
| 4,773,563 | A * | 9/1988 | Taylor | A47G 19/12 222/144.5 |
| 4,901,630 | A | 2/1990 | Hall | |
| 5,265,767 | A * | 11/1993 | Gustafson | A47G 19/12 222/144.5 |
| 5,335,589 | A | 8/1994 | Yerves, Jr. | |
| 5,921,440 | A * | 7/1999 | Maines | B65D 47/265 215/6 |
| 7,607,386 | B2 | 10/2009 | Wise | |
| 7,740,153 | B2 * | 6/2010 | Gustafson | A47G 19/14 220/543 |
| D666,452 | S | 9/2012 | Chapman | |
| 8,328,044 | B1 * | 12/2012 | Iskandar | A47G 19/2272 220/254.3 |
| 8,439,228 | B1 * | 5/2013 | Graham | B65D 1/04 222/144.5 |
| 8,640,904 | B2 * | 2/2014 | Steininger | B65D 47/265 220/253 |
| 9,029,738 | B2 * | 5/2015 | Redl | A47J 41/0038 219/387 |

\* cited by examiner

Primary Examiner — Charles P Cheyney

(57) ABSTRACT

The dual-chamber carafe is a beverage container that is formed with two separated storage chambers capable of separately storing two different beverages such as regular coffee and decaffeinated coffee. The dual-chamber carafe is an insulated container. Beverages are introduced separately into each separate storage chamber through an opening in the dual-chamber carafe. The opening is closed with a lid. The lid has a valve arrangement that allows the user to select which of the separated storage chambers liquids will be drawn from. The dual-chamber carafe comprises a carafe and a lid.

1 Claim, 4 Drawing Sheets

DUAL-CHAMBER CARAFE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of domestic articles for household use on a table, more specifically, a carafe configured for use in storing beverages.

SUMMARY OF INVENTION

The dual-chamber carafe is a beverage container that is formed with two separated storage chambers capable of separately storing two different beverages such as regular coffee and decaffeinated coffee. The dual-chamber carafe is an insulated container. Beverages are introduced separately into each separate storage chamber through an opening in the dual-chamber carafe. The opening is closed with a lid. The lid has a valve arrangement that allows the user to select which of the separated storage chambers liquids will be drawn from.

These together with additional objects, features and advantages of the dual-chamber carafe will be readily apparent to those of ordinary skill in the art upon reading the following detailed description of the presently preferred, but nonetheless illustrative, embodiments when taken in conjunction with the accompanying drawings.

In this respect, before explaining the current embodiments of the dual-chamber carafe in detail, it is to be understood that the dual-chamber carafe is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dual-chamber carafe.

It is therefore important that the claims be regarded as including such equivalent construction insofar as they do not depart from the spirit and scope of the dual-chamber carafe. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
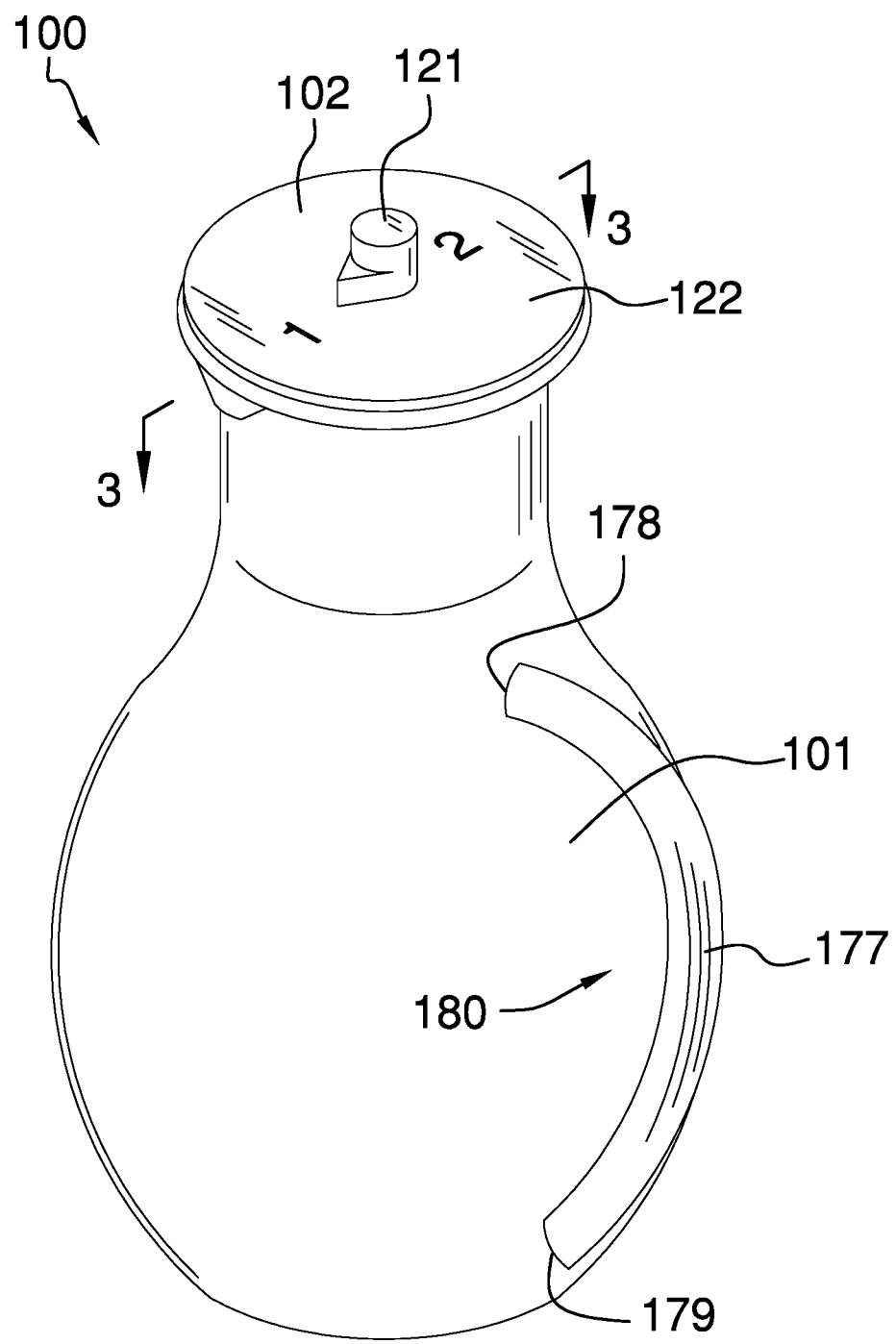
FIG. 1 is a perspective view of an embodiment of the disclosure.
Figure 2:
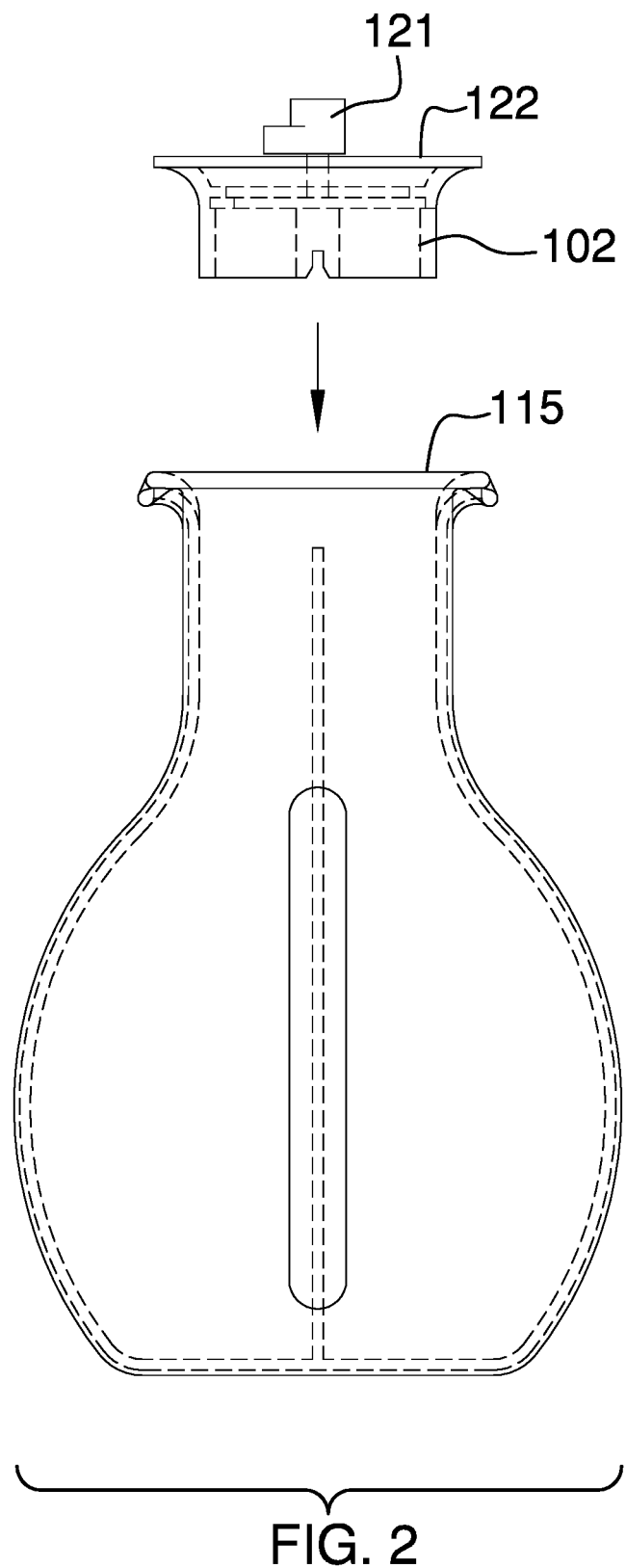
FIG. 2 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 4.

The dual-chamber carafe 100 (hereinafter invention) comprises a carafe 101 and a lid 102. The invention 100 is a beverage container that is formed with two separated storage chambers capable of separately storing two different beverages (referred to as a first liquid 131 and a second liquid 132) such as regular coffee and decaffeinated coffee. The invention 100 is an insulated container. The first liquid 131 and the second liquid 132 are introduced separately into each separate storage chamber through an opening 115 in the invention 100. The opening 115 is closed with a lid 102. The lid 102 has a valve arrangement that allows the user to select which of the separated storage chambers liquids will be drawn from.

The carafe 101 is an urn shaped flask within which the two separate beverages are stored. The carafe 101 further comprises a first chamber 111, a second chamber 112, an insulated exterior 113, an internal barrier 114, an opening 115, a first pour spout 116, and a second pour spout 117. The insulated exterior 113 is the outer shell of the carafe 101. The insulated exterior 113 is insulated to prevent the transfer of energy from the interior of the carafe 101 to the environment the carafe 101 is in. The interior surface 141 of the insulated exterior 113 is lined with glass 143 and the interior surface 141 of the insulated exterior 113 and the exterior surface 142 of the insulated exterior 113 are separated by a vacuum chamber 144. The interior space 118 of the carafe 101 further comprises a first chamber 111 and a second chamber 112. The first chamber 111 contains the first liquid 131 introduced into the carafe 101. The second chamber 112 contains the second liquid 132 introduced to the carafe 101. The first chamber 111 and the second chamber 112 are separated by the internal barrier 114.

The internal barrier 114 is an impermeable barrier that separates the first liquid 131 from the second liquid 132 and prevents the first liquid 131 from mixing with the second liquid 132. The first liquid 131 and the second liquid 132 are poured into the carafe 101 through the opening 115. The opening 115 is a port formed in the insulated exterior 113 that provides access to pour the first liquid 131 and the second liquid 132 into the first chamber 111 and the second chamber 112 respectively. The opening 115 further comprises a first pour spout 116 and a second pour spout 117. The first pour spout 116 is a lip formed within the opening 115 to channel and control liquids being poured out of the first chamber 111. The second pour spout 117 is a lip formed within the opening 115 to channel and control liquids being poured out of the second chamber 112.

The lid 102 is a device that is used to close and seal the opening 115 of the carafe 101 and to direct the flow of liquid from the chamber selected from the group consisting of the first chamber 111 or the second chamber 112 to the first pour spout 116 or the second pour spout 117 respectively. The lid 102 further comprises a selection knob 121, an outer cap 122, an inner cap 123, headroom 124, a center spindle 125, a selector disk 126, a plug cylinder 127, and a plug barrier 128. The plug cylinder 127 is a hollow cylindrical structure that is designed to fit into and seal the opening 115. The exterior face of the plug cylinder 127 is coated with an elastomeric sealing material that seals the plug cylinder 127 into the opening 115 and prevents liquids from escaping from between the plug cylinder 127 and the opening 115 while the lid 102 is in use. The plug barrier 128 is a barrier that is formed along the center diameter of the plug cylinder 127.

Figure 3:
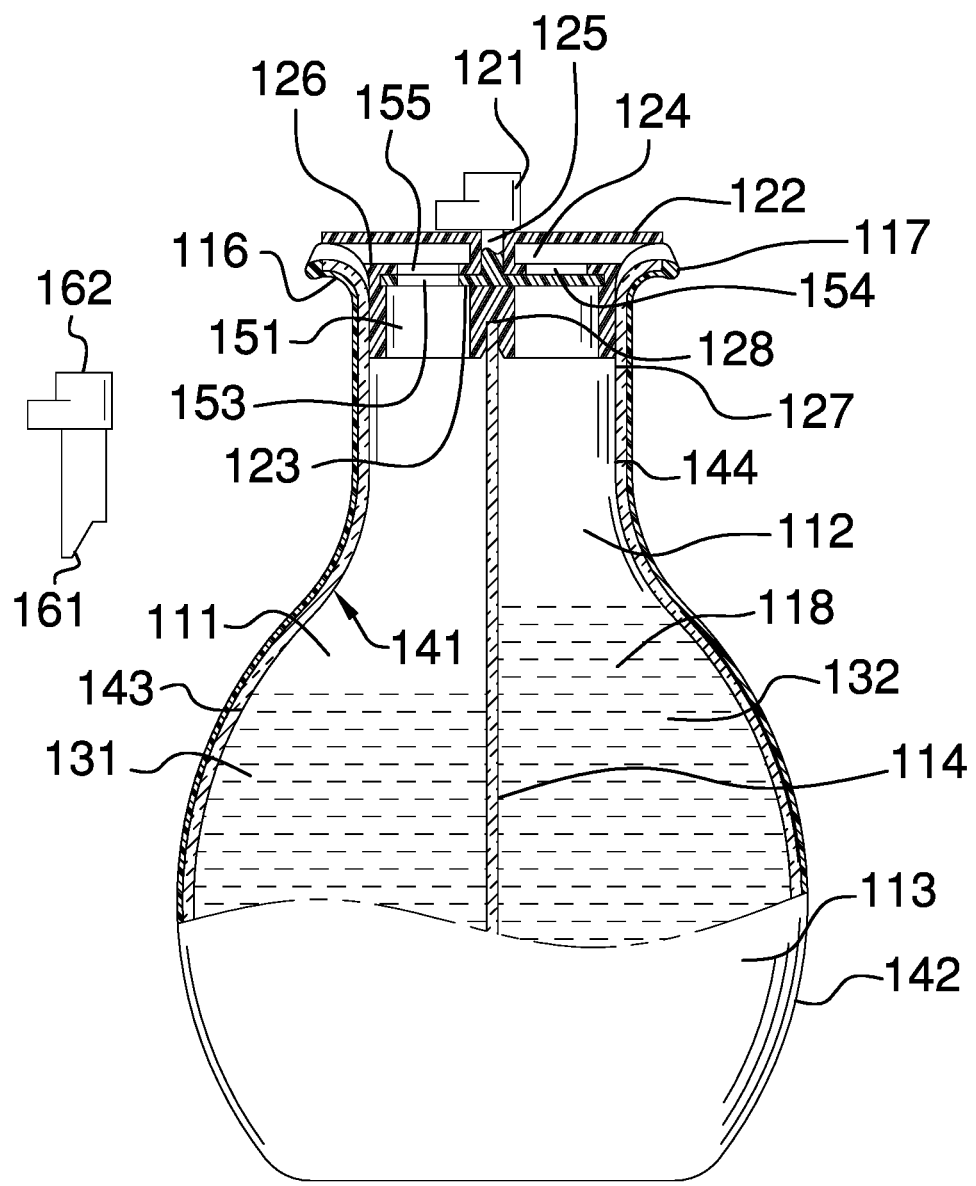
FIG. 3 is a cross-sectional view of an embodiment of the disclosure across 3-3 in FIG. 1.
Figure 4:
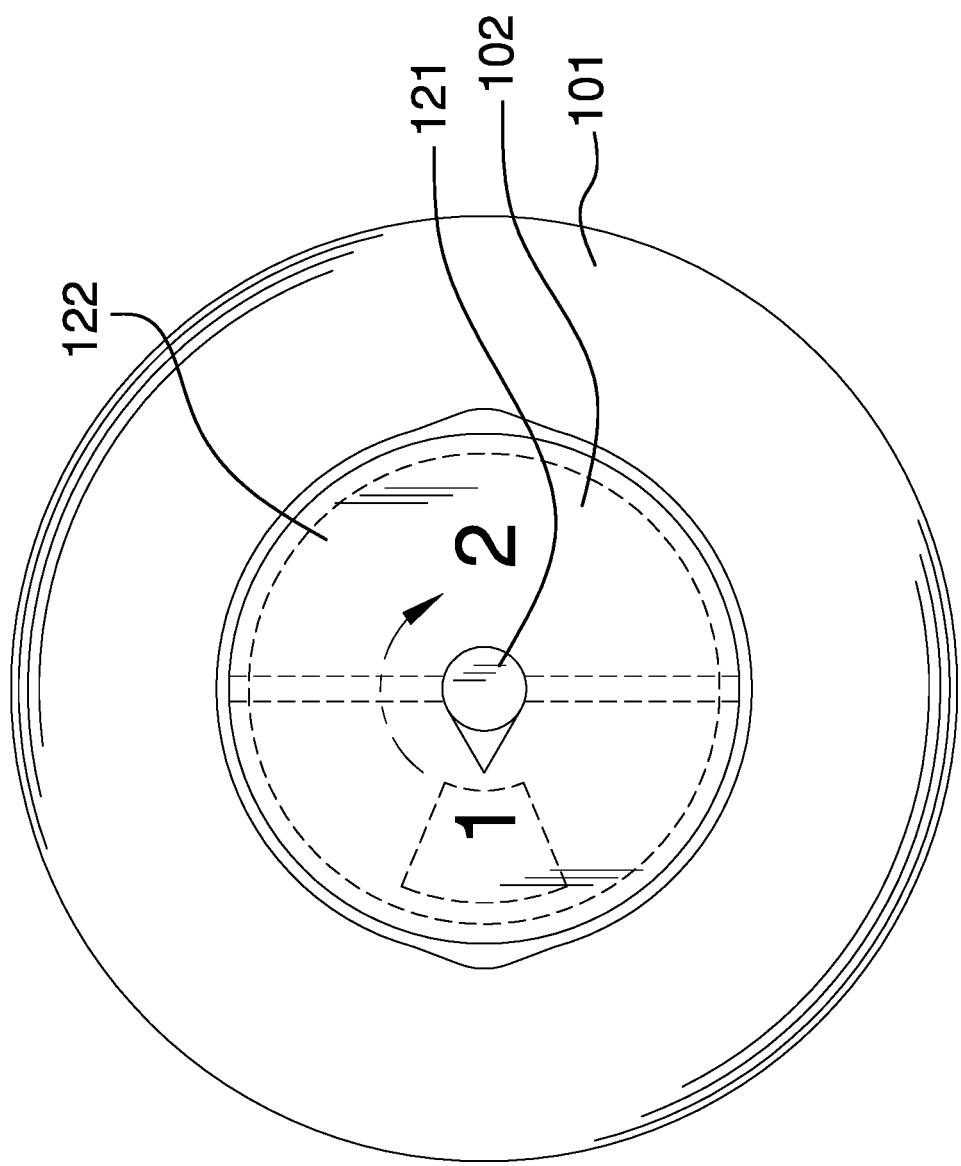
FIG. 4 is a top view of an embodiment of the disclosure.

As shown most clearly in FIG. 3, the plug barrier 128 is designed to fit over the internal barrier 114 of the carafe 101 in such a manner that the separation of the first chamber 111 and the second chamber 112 is maintained through the lid 102 while liquids are being poured out of the carafe 101. The plug barrier 128 separates the hollow space within the plug cylinder 127 into a first channel 151 and a second channel 152. The first channel 151 provides the path to transport liquid from the first chamber 111 to the first pour spout 116. The second channel 152 provides the path to transport liquid from the second chamber 112 to the second pour spout 117. The side of the plug cylinder 127 that is distal from the liquids stored in the first chamber 111 and the second chamber 112 is capped with the inner cap 123. The inner cap 123 is fitted with a first aperture 153 and a second aperture 154 that allows the unimpeded flow of the first liquid 131 from the first chamber 111 to the first pour spout 116 and allows the flow of the second liquid 132 from the second chamber 112 to the second pour spout 117 respectively. The first aperture 153 and the second aperture 154 have identical sizes and form factors.

The selector disk 126 is positioned on the inner cap 123 such that the selector disk 126 is against the surface of the inner cap 123 that is proximal to the liquids stored in the first chamber 111 and the second chamber 112. As shown most clearly in FIG. 3, the selector disk 126 is further formed with a selector aperture 155. The size and form factor of the selector aperture 155 is the same as the size and form factor of the first aperture 153 and the second aperture 154. The center spindle 125 is a shaft that is further defined with a first end 161 and a second end 162. The first end 161 and is attached to the center of the selector disk 126 such that the center spindle 125 projects through the inner cap 123 away from the first chamber 111 and the second chamber 112. The center spindle 125 spins the selector disk 126 such that the selector aperture 155 can be aligned with either the first aperture 153 or the second aperture 154.

When the selector aperture 155 is aligned with the first aperture 153, the first liquid 131 can flow freely from the first chamber 111 through the first channel 151 to the first pour spout 116 while the flow of the second liquid 132 from the second chamber 112 is blocked. Similarly, when the selector aperture 155 is aligned with the second aperture 154, the second liquid 132 can flow freely from the second chamber 112 through the second channel 152 to the second pour spout 117 while the flow of the first liquid 131 from the first chamber 111 is blocked. The second end 162 of the center spindle 125 is inserted through the center of the outer cap 122. The outer cap 122 is positioned on the center spindle 125 such that headroom 124 is created between the inner cap 123 and the outer cap 122. This headroom 124 allows the flow of the first liquid 131 from the first chamber 111 or the second liquid 132 from the second chamber 112 to flow to the first pour spout 116 or the second pour spout 117 respectively. The outer cap 122 is a barrier that provides a final closure to the opening 115 that prevents accidental spillage of liquids. A selection knob 121 is attached to the second end 162 of the center spindle 125. The selection knob 121 is used to spin the center spindle 125.

To use the invention 100, a first liquid 131 is placed in the first chamber 111 and a second, different, liquid 132 is placed in the second chamber 112. The selection knob 121 is rotated to a first position to allow the user to pour the first liquid 131 out of the first chamber 111 through the first pour spout 116 into a container. The selection knob 121 is rotated to a second position to allow the user to pour the second liquid 132 out of the second chamber 112 through the second pour spout 117 into a container.

The invention 100 may optionally include a handle 177 on the carafe 102. More specifically, the handle 177 is provided on the exterior surface 142 of the insulated exterior 113. The handle 177 is further defined with a first handle end 178 and a second handle end 179 that form a handle opening 180. Both the first handle end 178 and the second handle end 179 attach to the exterior surface 142 of the carafe 102.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A beverage container comprising:
a carafe and a lid;
wherein the beverage container is formed with two separated storage chambers;
wherein the two separated storage chambers are capable of separately storing two different beverages;
wherein the beverage container is an insulated container;
wherein a first liquid and the a second liquid are introduced separately into each separate storage chamber;
wherein the beverage container is closed with the lid;

wherein the lid has a valve arrangement that allows the selection of which of the separated storage chambers liquids will be drawn from the beverage container;

wherein the carafe is an insulated flask;

wherein the carafe further comprises a first chamber, a second chamber, an insulated exterior, an internal barrier, an opening, a first pour spout, and a second pour spout;

wherein the insulated exterior is the outer shell of the carafe;

wherein the interior space of the carafe further comprises a first chamber and a second chamber;

wherein the first chamber and the second chamber are separated by the internal barrier;

wherein the internal barrier is an impermeable barrier that separates the first liquid from the second liquid and prevents the first liquid from mixing with the second liquid;

wherein the opening is a port formed in the insulated exterior;

wherein the opening further comprises a first pour spout and a second pour spout;

wherein the lid is a device that is used to close and seal the opening of the opening of the carafe;

wherein the lid further comprises a selection knob, an outer cap, an inner cap, headroom, a center spindle, a selector disk, a plug cylinder, and a plug barrier;

wherein the plug cylinder is a hollow cylindrical structure that is designed to fit into and seal the opening;

wherein the exterior face of the plug cylinder is coated with an elastomeric sealing material;

wherein the plug barrier is a barrier that is formed along the center diameter of the plug cylinder;

wherein the plug barrier fits over the internal barrier of the carafe;

wherein the plug cylinder further comprises a first channel and a second channel;

wherein the side of the plug cylinder that is distal from the liquids stored in the first chamber and the second chamber is capped with the inner cap;

wherein the outer cap is positioned above the first pour spout, the second pour spout, and the headroom;

wherein the inner cap is positioned below the headroom, and the inner cap is fitted with a first aperture and a second aperture;

wherein the first aperture and the second aperture have identical sizes and form factors; wherein the selector disk is positioned on the inner cap such that the selector disk is against the surface of the inner cap that is proximal to the liquids stored in the first chamber and the second chamber;

wherein the selector disk is further formed with a selector aperture;

wherein the center spindle is a shaft that is further defined with a first end and a second end;

wherein the first end and is attached to the center of the selector disk such that the center spindle projects through the inner cap away from the first chamber and the second chamber;

wherein the center spindle spins the selector disk such that the selector aperture can be aligned with either the first aperture or the second aperture;

wherein the second end of the center spindle is inserted through the center of the outer cap;

wherein the selection knob is attached to the second end of the center spindle;

wherein a handle is provided on the carafe;

wherein the handle is provided on the exterior surface of the insulated exterior;

wherein the handle is further defined with a first handle end and a second handle end that form a handle opening;

wherein both the first handle end and the second handle end attach to the exterior surface of the carafe.

* * * * *